US005787920A

United States Patent [19]

Krasnov

[11] Patent Number: 5,787,920
[45] Date of Patent: Aug. 4, 1998

[54] TANK FOR COMPRESSED GAS

[76] Inventor: Igor Krasnov, 6835 Oakwood Trace Ct., Houston, Tex. 77040

[21] Appl. No.: 499,227

[22] Filed: Oct. 16, 1995

[51] Int. Cl.$^6$ .................................................. B65D 90/08
[52] U.S. Cl. .................................... 137/255; 220/565
[58] Field of Search ........................... 137/225, 256, 137/259; 220/564, 565, 532, 529

[56] References Cited

U.S. PATENT DOCUMENTS

| | | |
|---|---|---|
| 2,920,784 | 1/1960 | Boardman .................. 220/565 |
| 3,680,275 | 8/1972 | Romlet et al. ............. 220/564 X |
| 4,374,478 | 2/1983 | Secord et al. ............. 137/259 X |
| 5,346,092 | 9/1994 | Gerhard .................... 220/565 X |

*Primary Examiner*—Kevin Lee
*Attorney, Agent, or Firm*—James E. Bradley

[57] ABSTRACT

A tank for compressed natural gas utilizes internal tension members. The tank has an upper half and a lower half, each half being formed with at least two cylindrical portions separated by a Y-shaped junction. The sections of each half have engagement members in the interiors. The engagement members include a head and a socket which slide longitudinally together to secure the upper and lower halves against tension due to the gas pressure.

29 Claims, 3 Drawing Sheets

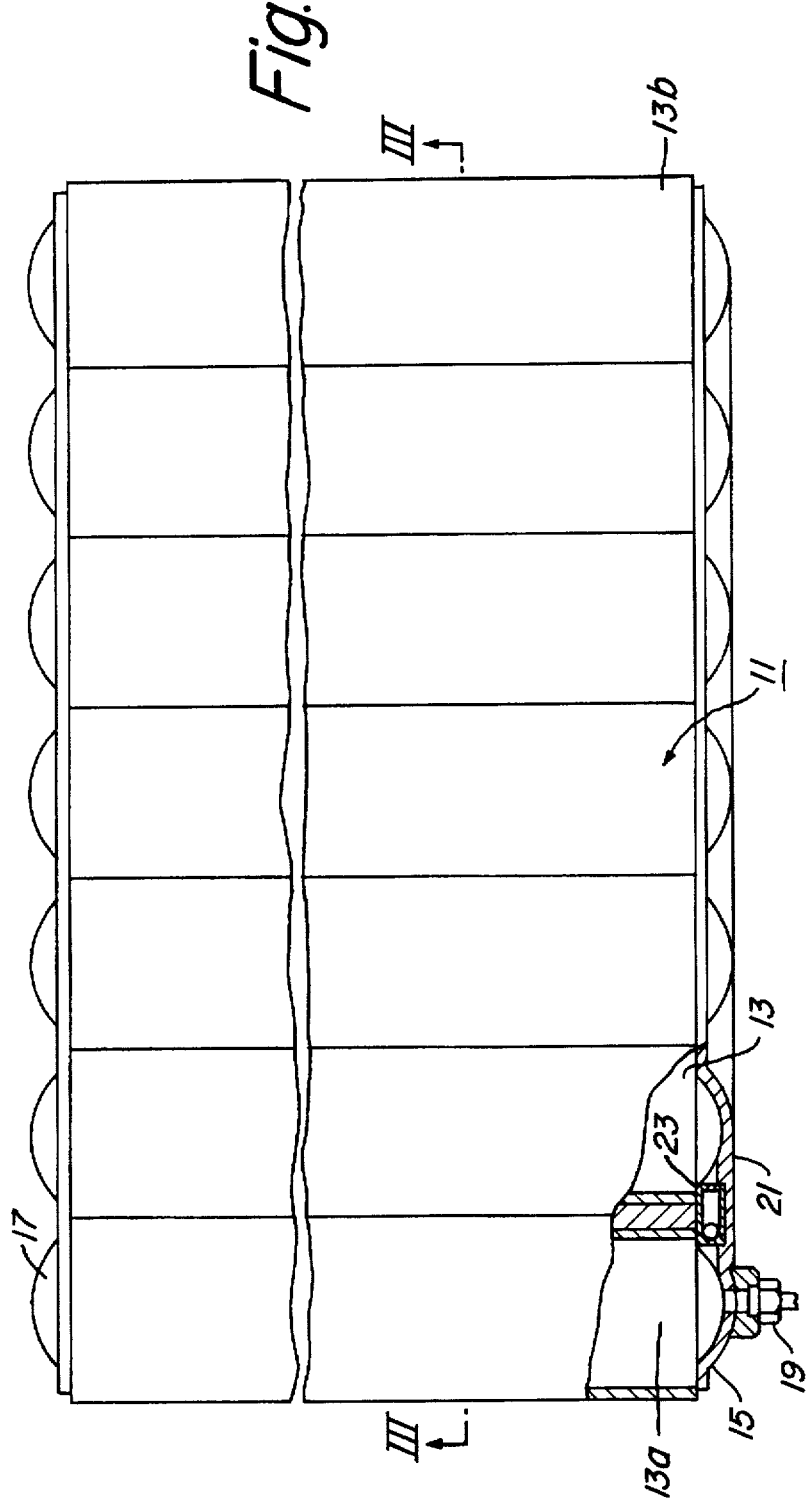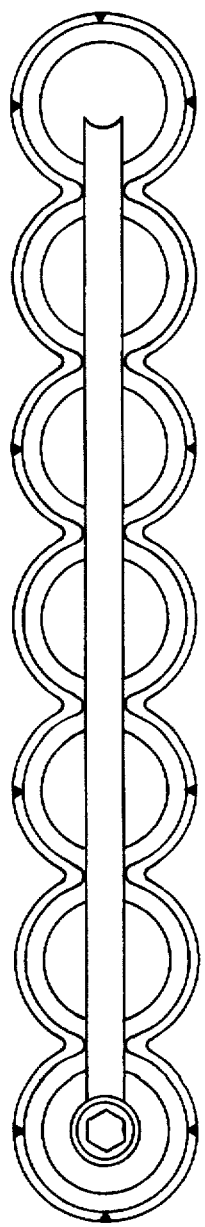

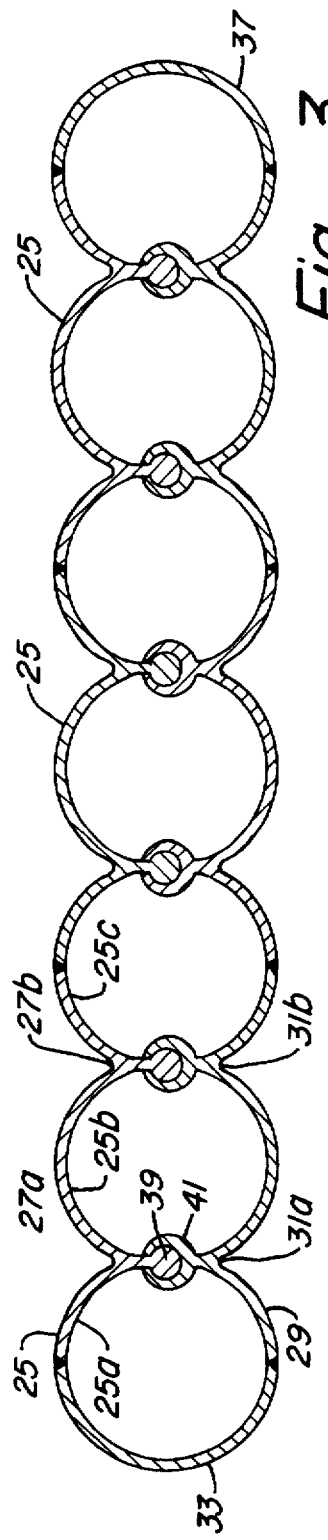
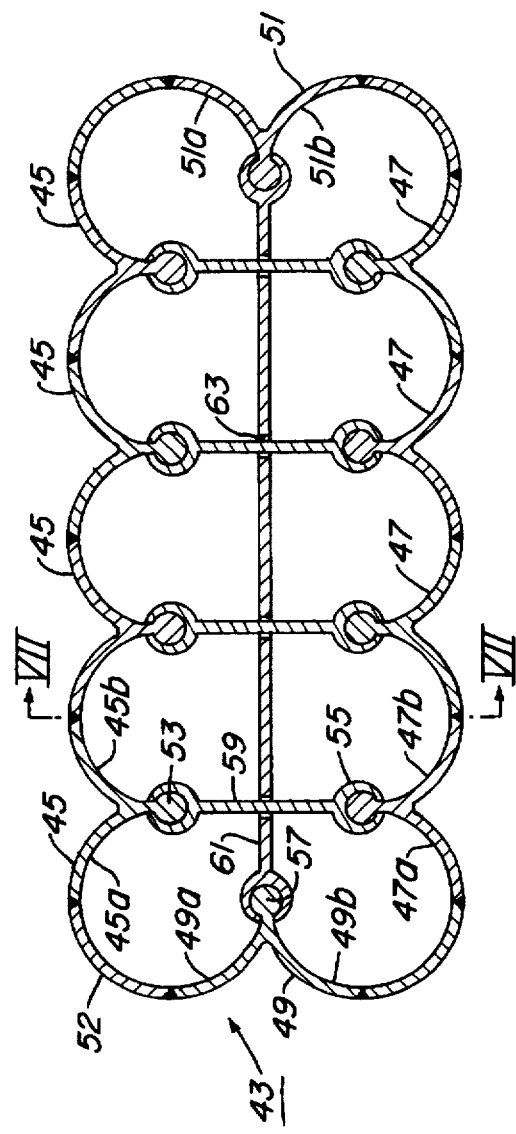
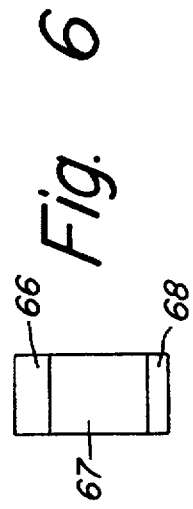
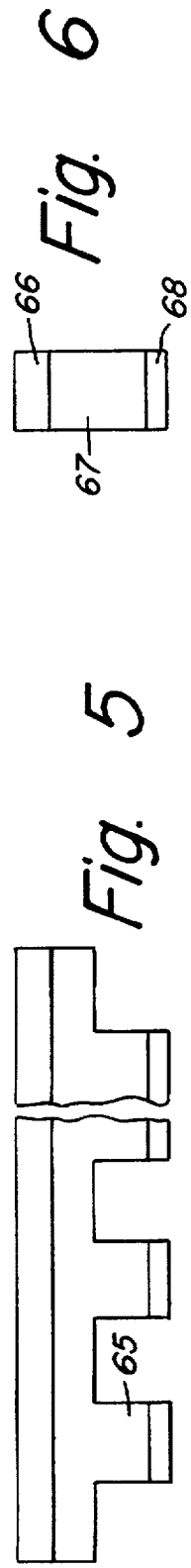

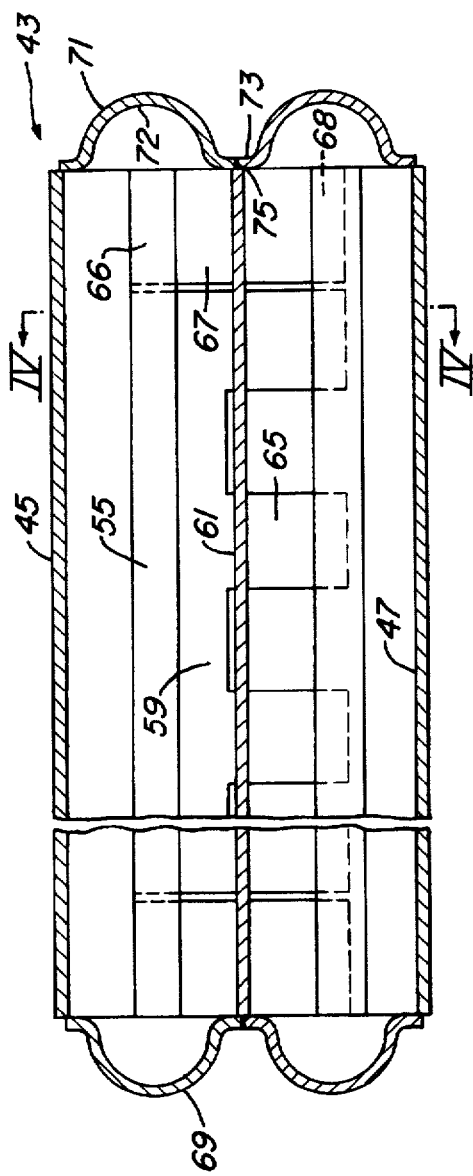
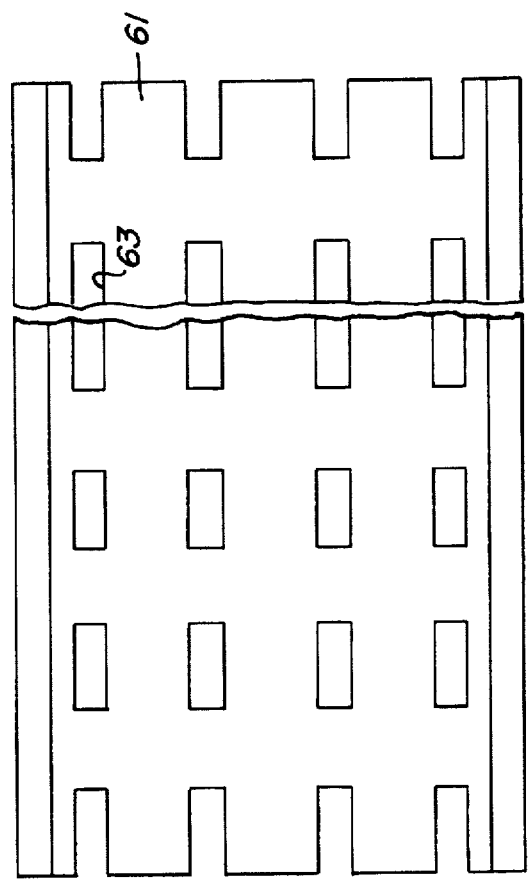

1

TANK FOR COMPRESSED GAS

BACKGROUND OF THE INVENTION

1. Field of the Invention

This invention relates in general to tanks, in particular to the vehicle fuel tank for containing compressed natural gas.

2. Description of the Prior Art

Operating vehicles with compressed natural gas has many advantages. One drawback is how to store an adequate amount of compressed natural gas on the vehicle, which has to be stored at pressures of 3600 psi or higher. Normally, a typical pressure vessel is used for storing the compressed natural gas, particularly a cylindrical bottle with spherical ends or a completely spherical bottle. The cylinder and spherical form are advantageous for tension loading of the walls. Pressure vessels of this nature have been well developed and are regulated by various standards. Flat surfaces, on the other hand, may bend and increase tension, requiring greater thickness.

In general, the wall thickness is in square proportion to the vessel diameter. This means that heavy storage bottles are necessary to hold significant amounts of gas. To reduce the weight of tanks for vehicles, one approach is to connect a battery of small diameter vessels. A disadvantage is that the exterior connections between the vessels are prone to damage and leaks. Also, vessels made from light weight metals, composite materials, or the combination are used. However, composite vessels expensive. Additionally, batteries of several small aluminum or composite bottles must be externally connected, and the connections are subject to leakage.

Another drawback for use in vehicles is the space requirement. Generally, a number of small pressure vessels are connected in a battery to achieve the desired driving range. The battery is dimensionally larger than the usual vehicle gasoline tank and therefore cannot locate in the same place as the usual vehicle gasoline tank. Typically the battery of tanks has to be placed on the bed of a truck or in a trunk, taking up cargo space. Also, locating the battery of tanks in those places will subject them to accidental damage because of the connections between bottles.

SUMMARY OF THE INVENTION

In this invention, tank components are constructed separately, preferably by extrusion. One section of the tank shell comprises at least two partially cylindrical portions separated by a Y-shaped junction. A mating section has a similar configuration. A tension member intersects the two sections internally at the junctions. The tension member comprises engagement members which slide longitudinally relative to each other to engage, such as a head and socket.

In one of the embodiments, the tension member comprises head and socket portions integrally formed in the interior of each section. In this embodiment, the two extruded sections are then assembled by sliding them relative to each other with the head and socket slidingly engaging each other. Then side sections and end covers are welded to complete the shell.

In another embodiment, the tension members are separate partitions that are inserted into the shell after the outer shell sections are extruded and joined together. The tension members have engagement members on each edge, such as head and sockets, for sliding into the assembled shell sections.

BRIEF DESCRIPTION OF THE DRAWINGS

FIG. 1 is a top plan view, partially broken away, illustrating a tank constructed in accordance with this invention.

FIG. 2 is a front elevational view of the tank of FIG. 1.

FIG. 3 is a sectional view of the tank of FIG. 1, taken along the line III—III of FIG. 1.

FIG. 4 is a sectional view of an alternate embodiment for a tank constructed in accordance with this invention and taken along the line IV—IV of FIG. 7.

FIG. 5 is a side view of a vertical tension member for use with the tank of FIG. 4.

FIG. 6 is a side view of a vertical spacer tension member for use with the tank of FIG. 4.

FIG. 7 is a sectional view of the tank of FIG. 4, taken along the line VII—VII of FIG. 4.

FIG. 8 is a top plan view of a horizontal tension member for the tank of FIG. 4.

DETAILED DESCRIPTION OF THE INVENTION

Referring to FIG. 1, tank 11 is constructed for holding compressed natural gas. Tank 11 will be normally mounted in a vehicle, and the gas therein may be under pressure of 3600 psi or higher. Tank 11 has a plurality of chambers 13, with seven chambers 13 being shown in the embodiment of FIGS. 1–3. The first chamber 13a is shown on the left side, and the last chamber 13b is shown in the right side. Each chamber 13 is a cylinder having a length substantially longer than the diameter. Each chamber 13 has a front cover 15 and a rear cover 17. Covers 15, 17 are semi-spherical in shape. Chambers 13 have parallel longitudinal axes.

An inlet 19 is located in the front cover 15 of the first chamber 13a. A manifold 21 joins the front covers 15 to each other and leads from intake 19. Check valves 23 (only one shown) are located in manifold 21 between each chamber 13. Check valves 23 allow free flow of compressed gas to each chamber 13 during filling through inlet 19. Check valves 23, however, will not allow reverse flow from one chamber 13 to the other through manifold 21. Check valves 23 reduce the chance of loss of all of the contents of chambers 13 in the event of leakage of one of the chambers 13. Preferably, tank 11 is positioned in the vehicle in a manner such that the most exposed portion to damage in the event of a collision is on the left side, at chamber 13a.

Referring to FIG. 3, the upper side of tank 11 has three separate extruded sections 25 of wall welded together. Each of the shell sections 25 has three partially cylindrical portions 25a, 25b and 25c. Left and right portions 25a and 25c are approximately one-fourth of a cylinder while central portion 25b is approximately one-half of a cylinder. The radius of each portion 25a, 25b and 25c is the same, and the longitudinal axes of the portions 25a, 25b, and 25c are parallel to each other. Left portion 25a joins central portion 25b at a Y-shaped junction 27a. Simarily, central portion 25b joins the right portion 25c at junction 27b that is also Y-shaped.

The lower side of tank 11 is identical, having three extruded lower sections 29 of wall welded together. Each section 29 has a three partially cylindrical portions joined by two Y-shaped junctions 31a, 31b. A partially cylindrical left side 33 is joined to the upper and lower sections 25, 29 by welding. A right hand partially cylindrical section 37 is joined to the right side of tank 11 by welding.

The upper sections 25 and lower sections 29 have tension means located in the interior for connecting each of the upper junctions 27a, 27b with each of the lower junctions 31a, 31b. The tension means for the assembled upper sections 25 comprises six engagement members 39 located in the interior of tank 11, each forming an interior portion of the junctions 27a and 27b. In the preferred embodiment, each engagement member 39 is a head for an elongated socket, the head comprising an elongated solid cylindrical rib extending the length of each section 25. The mating engagement members on the lower sections 29 comprise six sockets 41, each located in the interior of tank 11 and forming an interior portion of each lower junction 31a, 31b. Socket 41 has a cavity and a slot so as to slidingly receive head 39 before the upper sections 25 are welded to the lower sections 29.

To assemble tank 11, the upper wall portions 25a, 25b, and 25c are welded together as indicated. The lower wall portions 29 are welded together as indicated. Then the upper and lower sections 25, 29 are slid longitudinally relative to each other, with sockets 41 receiving heads 39. Then the side sections 33, 37 may be welded, creating a substantially cylindrical configuration for each of the chambers 13. Front and rear covers 15, 17 (FIG. 1) may then be welded to the shell.

To fill the tank 11, compressed gas is introduced through intake 19 (FIG. 1), with the gas freely flowing through check valves 23 to each of the chambers 13. Once at the desired pressure, the intake 19 is closed. In use, the vehicle will consume gas from a single outlet (not shown) which typically would be located in the first chamber 13a. Sockets 41 are retained within heads 39 due to the applied internal gas pressure. The heads 39 and sockets 41 (FIG. 3) do not provide a tight seal, rather allow gas to flow from one chamber 13 to the next at a low rate, tending to equalize the pressures in the various chambers 13. As the vehicle is driven, gas will flow between the clearances around heads 39 and sockets 41 and out a single intake at a rate much lower than filling through manifold 21. It is not necessary that an intake be present in each chamber. Because the consumption is normally at a fairly low rate, the clearances need not be very large.

FIG. 4 shows a tank 43 as an alternate embodiment. Tank 43 has an upper half made up of four sections 45 welded together. Each section 45 has two partially cylindrical portions 45a, 45b, each comprising approximately one-fourth of a cylinder. A Y-shaped junction separates the two portions 45a, 45b. Simarily, the lower half is made up of a plurality of sections 47, each having a partially cylindrical portion 47a and a partially cylindrical portion 47b. A left section 49 is located on the left side of tank 43, section 49 also being made up with two partially cylindrical portions 49a, 49b. A right section 51, having two partially cylindrical portions 51a, 51b, is located at the right side of tank 43. Quarter segment sections 52 are located at both sides, joining the upper sections 45 to the side sections 49, 51, and also joining the lower half 47 to the side sections 49.

An engagement means is located in the interior of each section 45, 47, 49 and 51 at the Y-shaped junctions. The engagement members for the upper sections 45 comprise elongated cylindrical ribs or heads 53. The engagement members for the lower sections 47 comprise upward facing elongated sockets 55 in the embodiment shown. The engagement members for the sides 49, 51 comprises heads 57. Each section 45, 47, 49, 51, including its integral engagement member 53, 55, or 57, is an extrusion.

A plurality of vertical tension members 59 extend vertically between engagement members 53, 55. Each tension member 55 is a flat partition or wall having a mating engagement member on its upper edge and on its lower edge. The socket on the upper edge of tension member 59 slides on one of the heads 53. The head on the lower end of tension member 59 slides within one of the sockets 55.

Simarily, a horizontal tension member 61, having sockets on each edge, extends between the heads 57 of the two sides 49, 51. Horizontal tension member 61 is a flat partition or wall. As shown in FIG. 8, a plurality of slots 63 are formed in horizontal tension member 61. The vertical tension member 59, as shown in FIG. 5, has a plurality of depending tabs 65. Tabs 65 extend through the slots 63, each tab 65 having a head on its free end for reception within one of the sockets 55 (FIG. 4). Gaps will exist in the spaces between the tabs 65, allowing free communication between the various chambers of tank 43. Tension members 59, 61 are provided for resisting internal pressure tending to push the junctions apart from each other.

As shown in FIGS. 6 and 7, in the embodiment shown, the length of the vertical tension members 59 is shorter than the length of tank 43. A separate spacer 67 is located at each end. Each spacer 67 is of the same configuration as vertical tension members 59, but shorter in length. Each spacer 67 has a socket 66 on the upper end for sliding on heads 53 (FIG. 4). Each spacer 67 has a head 68 on the lower end for sliding within one of the sockets 55. Spacer 67 locates within the open ended slots 63 at each end of the horizontal tension member 61.

A rear cover 69 is welded to the rearward ends of the various sections 45, 47, 49 and 51. Simarily, a front cover 71 is welded to the forward ends of the various sections 45, 47, 49 and 51. Each cover 69, 71 has a spherical portion 72 for each of the chambers. A depression 73 is located at the intersection of each of the spherical portions 72 with each other. Depression 73 extends into contact with the horizontal tension member 61 and the spacer 67. A weld 75 may be employed to weld depression 73 to the spacer 67. If so, spacer 67 is of a metal that is compatible with or the same as the metal of the front and rear covers 71, 69. If desired, the tension members 59, 61 may be of a different and higher strength metal or of a composite fiber material. Moreover, individual cables may be employed for the tension members 59, 61.

To fabricate the tank of FIGS. 4–8, the upper sections 45 will be extruded and welded to each other. The lower sections 47 will be extruded and welded to each other. The side sections 49, 51 will be extruded and welded by means of the segments 52 to the upper lower halves 45, 47. Then the vertical tension members 59 will be assembled with the horizontal tension member 61. In the assembly, tabs 65 will be inserted through the slots 63. The assembled horizontal and vertical tension members 61, 59 are slid longitudinally into the interior of the shell of tank 43. The engagement members on the vertical tension members 59 will engage the heads 53 and socket 55. The sockets on the horizontal tension member 61 will engage the heads 57.

Then the spacers 67 will be inserted from each open end. The covers 69, 71 will be placed over the assembly and welded in place. Tank 43 will have an intake (not shown) for charging with compressed natural gas. Because of the large gaps between the tabs 65 (FIG. 5), gas freely communicates between the chambers. Check valves such as check valves 23 (FIG. 1) are not employed. Tank 43 will also have a single outlet for feeding the gas out for consumption by the vehicle.

While the invention has been shown in only two of its form, it should be apparent to those skilled in the art that it is not so limited but susceptible to various changes without departing from the scope of the invention. The words "upper, lower, vertical, and horizontal" and the like, are used for convenience only, as the tanks may be oriented in various positions. Also, although the embodiment of FIGS. 1–3 is shown with all of the chambers aligned in a single straight line, the chambers could be welded to each other in an L-shape or other shapes.

I claim:

1. A tank for containing a gas, comprising in combination:
   a first section of wall having at least two parallel partially cylindrical portions integrally joined together at a first junction;
   a second section of wall having at least two parallel partially cylindrical portions integrally joined together at a second junction, the first and second sections being joined to each other to define a shell with an interior;
   tension means for resisting internal pressure tending to push the first and second junctions apart from each other, the tension means including engagement members formed selectively on interior surfaces of the junctions of the first and second sections for joining the first and second junctions to each other in the interior of the shell by sliding engagement; and
   front and rear covers joined to forward and rearward ends of the shell.

2. The tank according to claim 1, wherein the engagement members comprise elongated head and socket members.

3. The tank according to claim 1, wherein:
   the first and second junctions are Y-shaped; and
   the engagement members comprise elongated head and socket portions, with the head portion integrally formed on one of the sections of the shell and the socket portion integrally formed on the other of the sections of the shell.

4. The tank according to claim 1, wherein the first and second sections are extruded members.

5. The tank according to claim 1, wherein each of the covers has at least two spherical portions.

6. The tank according to claim 1, wherein:
   the engagement members comprise an elongated head portion and an elongated socket portion;
   the head portion is on the first section of the shell and the socket portion is on the second section of the shell;
   the first section, including the head portion, is an extruded member; and
   the second section, including the socket portion, is an extruded member.

7. The tank according to claim 1, wherein:
   the engagement members comprise an elongated head portion and an elongated socket portion;
   the head portion is on the first section and the socket portion is on the second section; and
   the head portion is joined to the socket portion by sliding engagement.

8. The tank according to claim 1, wherein:
   the tension means comprises a partition having a first edge and a second edge, with one of the engagement members being located on each of the edges;
   the first and second sections each have one of the engagement members formed in the interior of the shell at the first and second junctions; and wherein
   the engagement members of the partition slidingly engage the engagement members of the first and second sections.

9. The tank according to claim 1, wherein:
   the tension means defines separate first and second chambers in the tank; and the tank further comprises:

check valve means for allowing free flow of gas from the first chamber to the second chamber during filling of the first chamber, but prevents free flow of gas through the check valve means from the second chamber to the first chamber; and wherein
   the tension means has clearances therein which allow gas flow from the second chamber to the first chamber at a lesser rate than the rate occurring through the check valve means during filling of the first chamber, substantially cylindrical chambers separated by the engaging head and socket.

10. A tank for containing a gas, comprising in combination:
    a first section having an inner surface and an outer surface and at least two partially cylindrical portions which have parallel longitudinal axes and which are integrally joined together at a Y-shaped first junction;
    a longitudinally extending socket formed on the inner surface of the first section at the first junction;
    a second section having an inner surface and an outer surface and at least two partially cylindrical portions integrally joined together at a Y-shaped second junction;
    a longitudinally extending head formed on the inner surface of the second section at the second junction which mates with the socket to internally join the first and second junctions to each other to resist internal pressure tending to push the first and second junctions apart from each other; and
    the first and second sections having side edges which are joined to each other, and front and rear covers joined to forward and rearward ends of the first and second sections, defining a shell with at least two substantially cylindrical chambers separated by the engaging head and socket.

11. The tank according to claim 10, wherein:
    the first section, including the head, is an extruded member; and
    the second section, including the socket, is an extruded member.

12. The tank according to claim 10, wherein each of the covers has at least two spherical portions, one for each of the chambers.

13. The tank according to claim 10 wherein the side edges of the first and second sections are joined to each other by welding, and the covers are joined to the first and second sections by welding.

14. The tank according to claim 10, further comprising:
    check valve means for allowing free flow of gas from a first one of the chambers to a second one of the chambers during filling of the first one of the chambers, but preventing free flow of gas through the check valve means from the second one of the chambers to the first one of the chambers; and wherein
    the mating head and socket have clearances therein which allow gas flow from the second one of the chambers to the first one of the chambers at a lesser rate than the rate occurring through the check valve means during filling of the first one of the chambers.

15. A tank for containing a gas, comprising in combination:
    a shell having first and second sections, each of the sections being an extrusion having at least two partially cylindrical portions having parallel longitudinal axes and integrally joined together at a Y-shaped junction, the first and second sections being joined to each other;

each of the sections having an outer surface and an inner surface;

a longitudinally extending engagement member located on the inner surface at the junction of each of the sections;

a tension member insertable into the shell during assembly, having first and second edges, each edge having an engagement member which slidably engages the engagement members of the junctions of the first and second sections, to resist internal pressure tending to push the first and second sections apart from each other; and front and rear covers joined to forward and rearward ends of the shell.

16. The tank according to claim 15, wherein the engagement members comprise mating head and socket members.

17. The tank according to claim 15, wherein the tension member comprises a flat partition.

18. A tank for containing a gas, comprising in combination:

upper and lower sections and right and left side sections, each of the sections being an extrusion having at least two partially cylindrical portions having longitudinal parallel axes and integrally joined together at a Y-shaped junction, the upper and lower sections being joined to each other by the right and left side sections, defining a shell having at least four parallel axes;

each of the sections having an outer surface and an inner surface;

a longitudinally extending engagement member on the inner surface at the junction of each of the sections;

a vertical tension member having upper and lower edges, each edge having an engagement member which slidably engages the engagement members of the junctions of the upper and lower sections to resist internal pressure tending to push the upper and lower sections apart from each other;

a horizontal tension member having right and left edges, each edge of the horizontal tension member having an engagement member which slidably engages the engagement members of the junctions of the right and left side sections to resist internal pressure tending to push the right and left side sections apart from each other; and front and rear covers joined to forward and rearward ends of the shell.

19. The tank according to claim 18, wherein the engagement members comprise mating head and socket members.

20. The tank according to claim 18, wherein the tension members comprises flat partitions.

21. The tank according to claim 18, wherein one of the tension members comprises a partition with a plurality of slots and the other of the tension members comprises a partition with a plurality of tabs which insert through the slots.

22. The tank according to claim 18, wherein the front and rear covers each have a spherical portion for each of the partially cylindrical portions of each of the sections.

23. The tank according to claim 18, wherein:

the front and rear covers each have a spherical portion which has a center of radius that coincides with one of the longitudinal axes, the spherical portions defining at least one depression between the spherical portions; and the depression is welded to at least one of the tension members to resist internal pressure tending to push the depression outward.

24. The tank according to claim 18, wherein:

the front and rear covers each have a spherical portion which has a center of radius that coincides with one of the longitudinal axes, the spherical portions defining at least one depression between the spherical portions; and at least one of the tension members comprises a central section and two separate end spacer tension members of a metal that differs from the material of the central section; and the depressions are welded to the spacer tension members to resist internal pressure tending to push the depressions outward.

25. A method of fabricating a tank for containing a gas, comprising:

providing first and second sections, each of the sections having at least two partially cylindrical portions having parallel longitudinal axes and integrally joined together at a junction which extends longitudinally along the lengths of the first and second sections;

providing the first and second sections with slidable engagement members at an inner surface of the junctions;

joining the first and second sections to each other at side edges;

joining the junctions of the sections to each other to resist internal pressure by longitudinally sliding the engagement members relative to each other during assembly of the tank; and joining front and rear covers to forward and rearward ends of the sections.

26. The method according to claim 25 wherein the step of joining the junctions of the sections to each other comprises sliding one of the sections relative to the other section prior to joining the side edges.

27. The method according to claim 25 wherein the step of joining the junctions of the sections to each other comprises:

providing a tension member which has first and second edges, each having an engagement member;

sliding the engagement member of the tension member into the engagement members of the first and second sections.

28. The method according to claim 25, wherein the step of providing the first and second sections comprises extruding the first and second sections with the engagement members thereon.

29. A method of fabricating a tank for containing a gas, comprising in combination:

separately extruding upper and lower sections of wall and right and left side sections of wall, each of the sections having at least two partially cylindrical portions having parallel longitudinal axes and integrally joined together at a Y-shaped junction, each of the sections having on an inner surface at its junction a longitudinally extending engagement member;

joining the sections to each other with all of the axes parallel to each other to define a shell;

assembling a vertical tension member and a horizontal tension member together perpendicular to each other, providing the vertical tension member with upper and lower engagement members and the horizontal tension member with right and left engagement members;

sliding the assembled vertical and horizontal tension members into the engagement members of the sections after the sections have been joined; and joining front and rear covers to forward and rearward ends of the shell.

* * * * *